US008794990B2

(12) United States Patent
Deno et al.

(10) Patent No.: US 8,794,990 B2
(45) Date of Patent: Aug. 5, 2014

(54) TERMINAL PAIR

(75) Inventors: Masahiro Deno, Makinohara (JP); Yoshitaka Tsushima, Makinohara (JP)

(73) Assignee: Yazaki Corporation, Tokyo (JP)

( * ) Notice: Subject to any disclaimer, the term of this patent is extended or adjusted under 35 U.S.C. 154(b) by 3 days.

(21) Appl. No.: 13/811,978

(22) PCT Filed: Jul. 7, 2011

(86) PCT No.: PCT/JP2011/066028

§ 371 (c)(1),
(2), (4) Date: Jan. 24, 2013

(87) PCT Pub. No.: WO2012/014687

PCT Pub. Date: Feb. 2, 2012

(65) Prior Publication Data

US 2013/0122731 A1 May 16, 2013

(30) Foreign Application Priority Data

Jul. 27, 2010 (JP) ................................ 2010-167811

(51) Int. Cl.
*H01R 4/50* (2006.01)

(52) U.S. Cl.
USPC .......................................................... 439/345

(58) Field of Classification Search
USPC .................... 439/345, 607.01, 607.44, 607.5, 439/607.51, 607.41, 98, 99, 550, 555, 559, 439/562–564, 573, 95, 275, 587, 424, 465, 439/877
See application file for complete search history.

(56) References Cited

U.S. PATENT DOCUMENTS

| | | | | |
|---|---|---|---|---|
| 6,991,493 | B2 * | 1/2006 | Matsui et al. | 439/579 |
| 7,476,129 | B2 * | 1/2009 | Droesbeke et al. | 439/607.41 |
| 2002/0106918 | A1 | 8/2002 | Saito et al. | |
| 2008/0096403 | A1 * | 4/2008 | Hunter et al. | 439/98 |

FOREIGN PATENT DOCUMENTS

| | | |
|---|---|---|
| JP | 2000-182683 A | 6/2000 |
| JP | 2002-218622 A | 8/2002 |
| JP | 2005-100849 A | 4/2005 |
| JP | 2005-129391 A | 5/2005 |

OTHER PUBLICATIONS

International Seach Report and Written Opinion dated Oct. 18, 2011, issued for PCT/JP2011/066028.
Supplementary European Search Report dated Dec. 5, 2013, issued for the corresponding European patent application No. 11812279.5.

* cited by examiner

*Primary Examiner* — Edwin A. Leon
(74) *Attorney, Agent, or Firm* — Edwards Wildman Palmer LLP

(57) ABSTRACT

A terminal pair 1 includes: a pair of terminals 2*a*, 2*b*; a plurality of locking portions 7; and a plurality of lock-receiving portions 8*a*, 8*b*. Each of the terminals includes: a shield fixing portion 3 to which the shielded wire 20 is attached; and an attaching portion 5 continued to the shield fixing portion 3 and attached to a vehicle body panel 4 by overlapping with the vehicle body panel 4 and fastening to the vehicle body panel 4 with a bolt 9. The locking projections 7 are provided on the attaching portion 5 of one terminal 2*a* of the pair of terminals 2*a*, 2*b*. The lock-receiving projections 8*a*, 8*b* are provided on the attaching portion 5 of the other terminal 2*b*, and locked by the locking portions 7.

4 Claims, 4 Drawing Sheets

TERMINAL PAIR

TECHNICAL FIELD

This invention relates to a terminal pair configured to be attached to a braid of a shielded wire or the like and to connect the braid with an attached member such as a vehicle body.

BACKGROUND ART

A shielded wire is often arranged in a vehicle as a moving object. Various terminal pairs (for example, see Patent document 1) are used for electrically connecting the braid of the shielded wire as an earth with a vehicle body. Such a terminal pair includes a pair of terminals. The terminal is respectively made by punching and folding a metal plate. The terminal integrally includes: a cylindrical shield fixing portion; and an attaching portion attached to a vehicle body as the earth (corresponding to an attached member).

The shield fixing portion is attached to a shielded wire in a condition to be electrically connected to the braid of the shielded wire when an outer cover of the shielded wire is removed, and a place where the braid is exposed is inserted into an inside of the shield fixing portion, and is crimped in a direction that a diameter thereof is reduced.

The attaching portion is formed in a flat plate shape, and an outer edge thereof is continued to the shield fixing portion. An insertion hole for inserting a bolt as a fastening member is penetrated at the center of the attaching portion. When the bolt inserted into the through hole is screwed into (fasten) a weld nut mounted on a vehicle body, the attaching portion is overlapped with and attached to the vehicle body.

The above-described terminal pair is attached to a vehicle body when the shielded wire is attached to the shield fixing portion, the attaching portion is overlapped with the vehicle body, a bolt is inserted into the through hole, and the bolt is screwed into a weld nut.

PRIOR ART DOCUMENT

Patent Document

Patent Document 1: JP, A, 2002-218622

DISCLOSURE OF THE INVENTION

Problem to be Solved by the Invention

Because the attaching portion of the above-described conventional terminal pair is formed in a flat plate shape, when a bolt is screwed into a weld nut, the attaching portion, in particular, at an upper side of the terminal may be rotated together with the screwed bolt head. Therefore, in particular, the upper side of the terminal may be fixed to a vehicle body in a state that the terminal is rotated about the bolt. Namely, it is difficult to maintain a position relationship of the terminals relative to each other in a regular position relationship. Further, because a pair of terminals is separated from each other, it is difficult to position the terminals relative to each other, and to position terminals relative to a vehicle body until the bolt inserted into a through hole is screwed into the weld nut. Therefore, workability to attach the terminals to a vehicle body is reduced.

Accordingly, an object of the present invention is to provide a terminal pair allowed to be easily attached to an attached member, and allowed to maintain a position relationship of terminals relative to each other in a regular position relationship.

Means for Solving the Problem

For attaining the object, according to the invention described in claim 1, there is provided a terminal pair comprising: a pair of terminals each having a shield fixing portion to which a shield electric wire is attached, and an attaching portion continued to the shield fixing portion and attached to an attached member by overlapping with the attached member and by fastening a fastening member, said pair of terminals being configured to be attached to the attached member when the attaching portions of the pair of terminals are overlapped with each other, and the fastening member is fastened, wherein one of the pair of terminals has a locking portion mounted on the attaching portion, and the other one of the pair of terminals has a lock-receiving portion mounted on the attaching portion to be locked by the locking portion.

According to the invention described in claim 2, there is provided the terminal pair as claimed in claim 1, wherein a plurality of the locking portions and a plurality of the lock-receiving portions are respectively provided separately from each other in a circumferential direction around a through hole for inserting the fastening member of the attached member.

According to the invention described in claim 3, there is provided the terminal pair as claimed in claim 2, wherein the locking portion is formed in a claw shape projected outward from an edge of the attaching portion of the one terminal, and wherein one of the lock-receiving portions is formed in a flake shape extended vertically from an end of the attaching portion of the other terminal toward the one terminal and provided with a hole for inserting the locking portion.

According to the invention described in claim 4, there is provided the terminal pair as claimed in claim 3, wherein the other lock-receiving portion includes: a flake shaped main body extended vertically from an edge of the other terminal toward the one terminal; and a clamping piece continued from the main body and extended from the main body toward the attaching portion and configured to clamp the locking portion with the attaching portion.

According to the invention described in claim 5, there is provided the terminal pair as claimed in any one of claims 1 to 4, wherein the attaching portion of each terminal is made by overlapping two metal plates, and includes a crimping piece continued from an edge of the one metal plate for fixing the two metal plates to each other by being folded in a manner to overlap with the other metal plate, and wherein the crimping piece is provided at a position where the locking portion or the lock-receiving portion is positioned between the attaching portions.

According to the terminal pair of the present invention described in claim 1, because one terminal is provided with the locking portion and the other terminal is provided with the lock-receiving portion, the terminals can be fixed to each other by locking the locking portion with the lock-receiving portion before attached to the attached member.

According to the terminal pair of the present invention described in claim 2, because the locking portion and the lock-receiving portion are provided separately from each other in the circumferential direction around the through hole, the terminals can be more surely fixed to each other.

According to the terminal pair of the present invention described in claim 3, because the locking portion is formed in a claw shape, and the one of the lock-receiving portions is formed in a flake shape provided with a hole for inserting the locking portion, the locking portion is locked in the lock-receiving portion when the claw-shaped locking portion is inserted into the hole of the flake-shaped lock-receiving portion.

According to the terminal pair of the present invention described in claim 4, because the other lock-receiving portion includes: a flake shaped main body; and a clamping piece continued from the main body and configured to clamp the locking portion with the attaching portion, the locking portion can be locked in the lock-receiving portion by clamping the claw-shaped locking portion with the attaching portion and the clamping piece. Further, because the one lock-receiving portion is formed in a flake shape provided with a hole, and the other one lock-receiving portion includes a clamping piece, even when a dimension error is generated in the terminal, the attaching portions, namely, terminals are surely fixed to each other by a plurality of lock-receiving portions.

According to the terminal pair of the present invention described in claim 5, because the crimping piece is provided at a position where the locking portion or the lock-receiving portion is positioned between the attaching portions, two metal plates composing the attaching portions are surely fixed to each other, further, when the crimping pieces for positioning the locking portions therebetween abut on sides of the lock-receiving portions, the terminals are prevented from rotating relative to each other.

Effects of the Invention

According to the invention claimed in claim 1, the terminals can be fixed to each other by locking the locking portion with the lock-receiving portion before attached to the attached member. Therefore, when the terminal is attached to the attached member, namely, the fastening member is fastened, the relative position of the attaching portion of the terminal is prevented from changing. Further, even when the attaching portion of the terminal disposed at an upper position is tried to be rotated by the fastening member, because the upper terminal is fixed to the lower terminal, the terminals are hard to be rotated. Therefore, the terminals can be easily attached to the attached member, and the relative position relationship between the terminals is maintained in the regular position relationship.

According to the invention claimed in claim 2, because the locking portion and the lock-receiving portion are provided separately from each other in the circumferential direction around the through hole, the terminals can be more surely fixed to each other. Therefore, the terminals can be more easily attached to the attached member, and the relative position relationship between the terminals is surely maintained in the regular position relationship.

According to the invention claimed in claim 3, the locking portion is locked in the lock-receiving portion when the claw-shaped locking portion is inserted into the hole of the flake-shaped lock-receiving portion. Therefore, before the terminals are attached to the attached member, the terminals are surely fixed to each other.

According to the invention claimed in claim 4, the locking portion can be locked in the lock-receiving portion by clamping the claw-shaped locking portion with the attaching portion and the clamping piece. Therefore, before the terminals are attached to the attached member, the terminals are surely fixed to each other.

Further, because the one lock-receiving portion is formed in a flake shape provided with a hole, and the other one lock-receiving portion includes a clamping piece, even when a dimension error is generated in the terminal, the attaching portions, namely, terminals are surely fixed to each other by a plurality of lock-receiving portions.

According to the invention claimed in claim 5, because the crimping piece is provided at a position where the locking portion or the lock-receiving portion is positioned between the attaching portions, two metal plates composing the attaching portions are surely fixed to each other, farther, when the crimping pieces for positioning the locking portions therebetween abut on sides of the lock-receiving portions, the terminals are prevented from rotating relative to each other.

DESCRIPTION OF EMBODIMENTS

Figure 1:
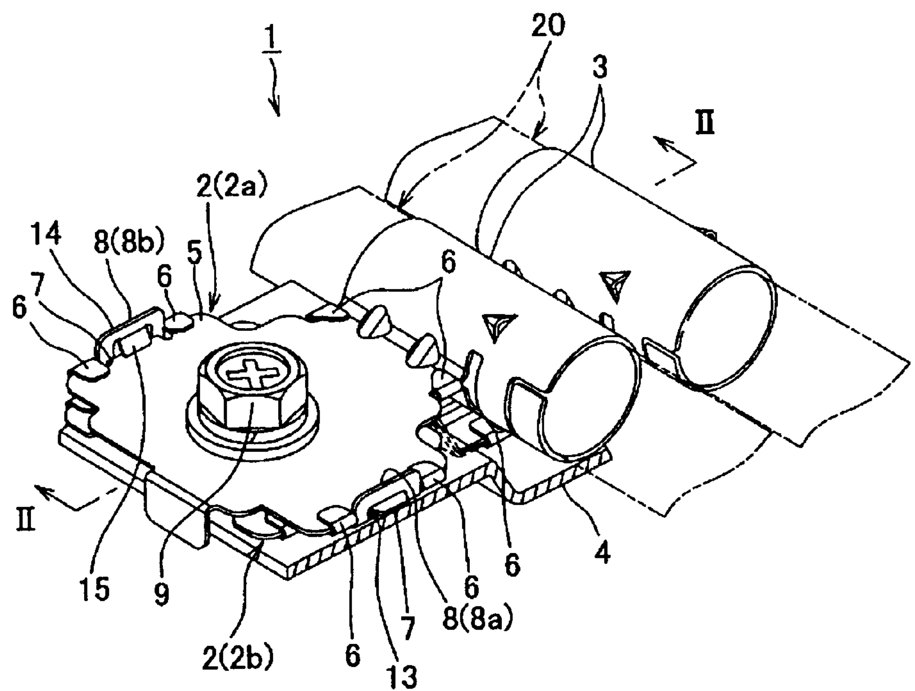
FIG. 1 A perspective view showing a terminal pair according to an embodiment of the present invention.
Figure 2:
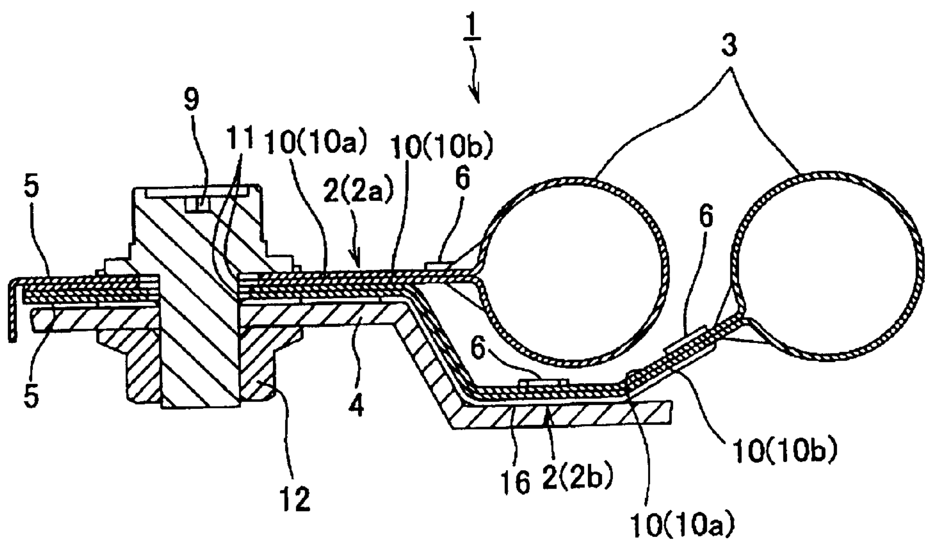
FIG. 2 A sectional view taken on line II-II in FIG. 1.
Figure 3:
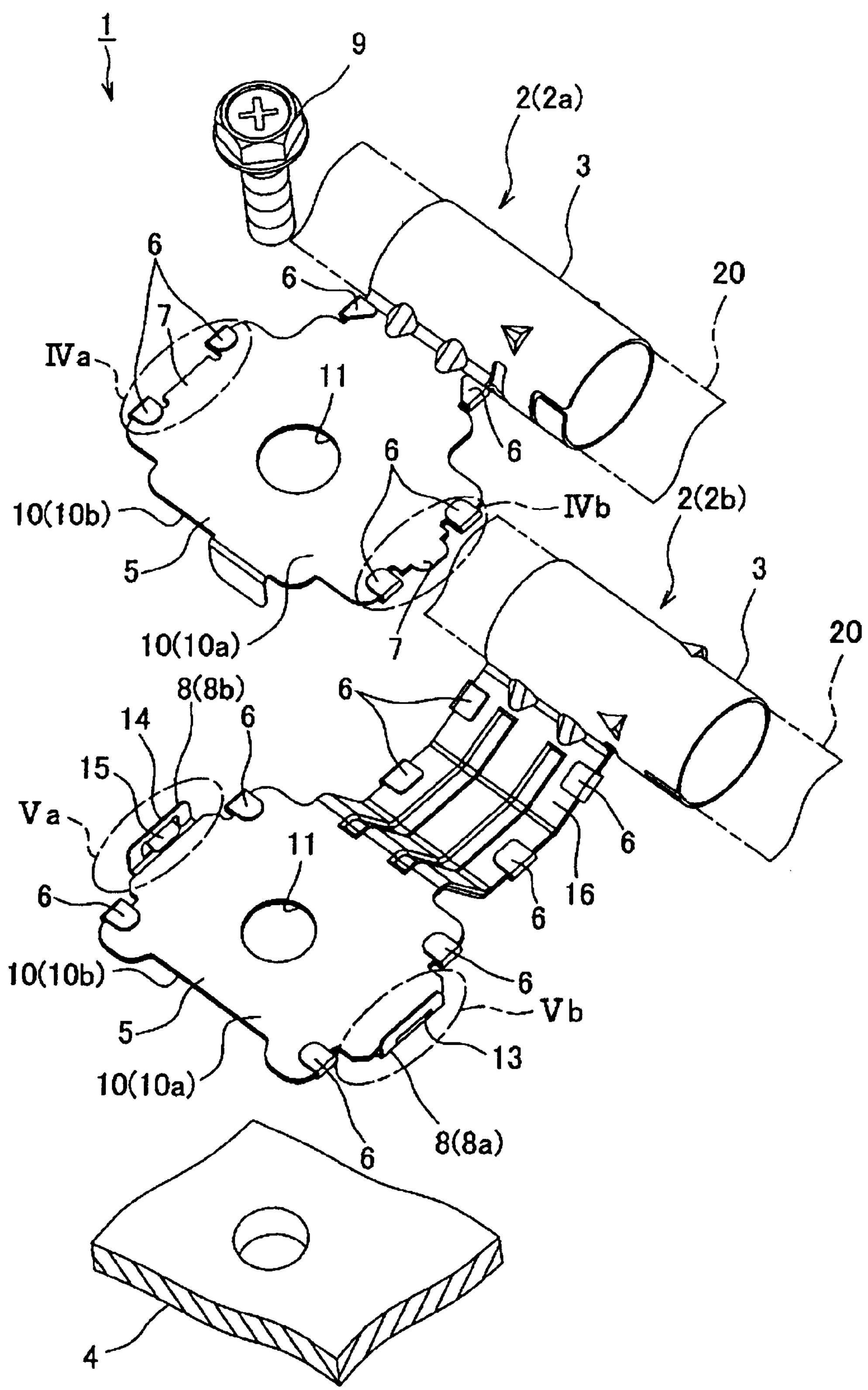
FIG. 3 An exploded perspective view showing the terminal pair shown in FIG. 1.

Hereinafter, a terminal pair according to an embodiment of the present invention will be explained with reference to FIGS. 1 to 7. A terminal pair 1 shown in FIG. 1 includes: a pair of terminals 2*a*, 2*b*; a plurality of locking portions 7; and a plurality of lock-receiving portions 8 as shown in FIGS. 1 to 3. The terminals 2*a*, 2*b* are respectively made by punching and folding a metal plate 10. As shown in FIG. 3, each of the terminals 2*a*, 2*b* integrally includes: a cylindrical shield fixing portion 3; an attaching portion 5 configured to be attached to a vehicle body panel 4 (corresponding to the attached member) composing a vehicle body as an earth; a plurality of crimping pieces 6.

The shield fixing portion 3 is disposed at the center of the metal plate 10.

The shield fixing portion 3 is attached to a shielded wire 20 in a condition to be electrically connected to the braid of the shielded wire 20 when an outer cover of the shielded wire 20 is removed, and a place where the braid is exposed is inserted into an inside of the shield fixing portion 3, and is crimped in a direction that a diameter thereof is reduced.

The attaching portion 5 is made by overlapping both ends of the metal plate 10, and formed in a flat plate shape. Namely, as shown in FIG. 2, the attaching portion 5 is made by overlapping two metal plates 10*a*, 10*b*. An outer edge of the attaching portion 5 is continued to the shield fixing portion 3. A through hole 11 for inserting a bolt 9 (shown in FIG. 2) as a fastening member penetrates the center of the attaching portion 5. The attaching portion 5 is overlapped with and fixed to the vehicle body panel 4, namely, a vehicle body when the bolt 9 is inserted into the through hole 11 and screwed into (fastened with) a weld nut 12 (shown in FIG. 2) mounted on the vehicle body panel 4.

The crimping pieces 6 are continued to edges of the one metal plate 10*b* disposed lower in FIG. 2 of the two metal plates 10*a*, 10*b* composing the attaching portion 5, and by folding the metal plate 10*b* in a manner overlapping with the metal plate 10*a*, fix the two metal plates 10*a*, 10*b*. Two crimping pieces 6 are provided at an end of the attaching portion 5 near the shield fixing portion 3, two crimping pieces 6 are provided at an end away from the shield fixing portion 3, and two crimping pieces 6 are provided at a middle of both ends. Thus, the crimping pieces 6 are positioned to surround the locking portions 7 or the lock-receiving portions. Further, the crimping pieces 6 configured to position the locking portions 7 therebetween abut on sides of the lock-receiving portions 8. There three pairs of the crimping pieces 6 are respectively arranged with a gap in a longitudinal direction of the shielded wire 20 attached to the shield fixing portion 3.

Figure 4A:
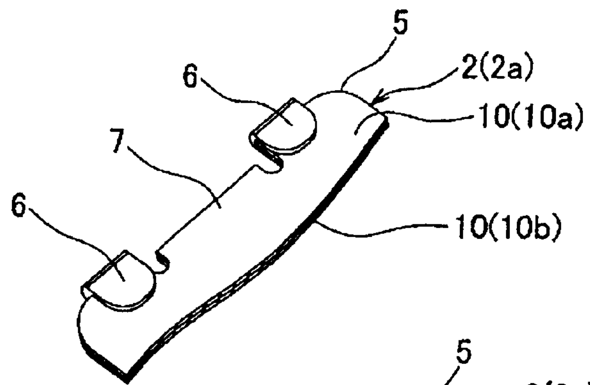
FIG. 4A An enlarged perspective view showing IVa portion in FIG. 3.
Figure 4B:
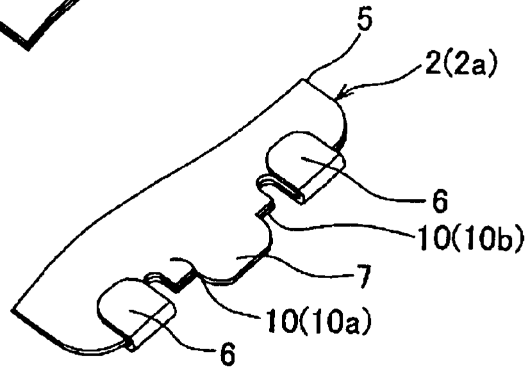
FIG. 4B An enlarged perspective view showing IVb portion in FIG. 3.

Two locking portions 7 are provided on one terminal 2*a* disposed on an upper side of FIG. 3 of the two terminals 2*a*, 2*b*. As shown in FIGS. 4A and 4B, the locking portion 7 is interposed between the crimping piece 6 disposed on an end of the terminal 2*a* away from the shield fixing portion 3 and the crimping piece 6 disposed at the center of the terminal 2*a*. The two locking portions 7 are arranged with a gap in the longitudinal direction of the shielded wire 20 attached to the shield fixing portion 3. Therefore, these two locking portions 7 are arranged with a gap in a circumferential direction around the through hole 11. The two locking portions 7 are projected outward from an outer edge of the metal plate 10*a* composing the attaching portion 5.

Figure 5A:
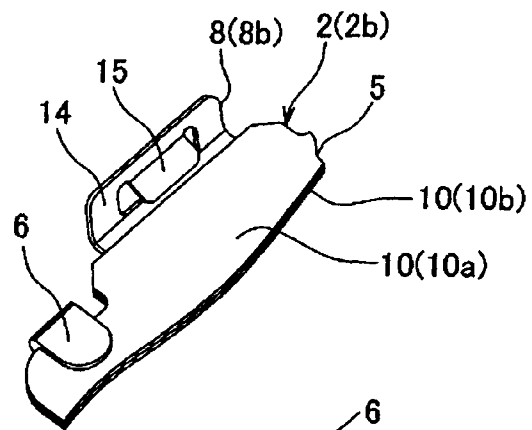
FIG. 5A An enlarged perspective view showing Va portion in FIG. 3.
Figure 5B:
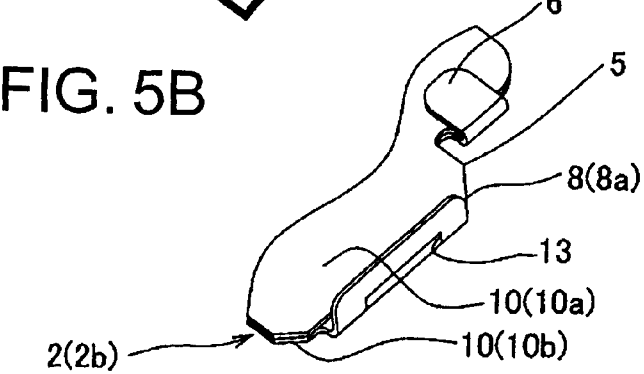
FIG. 5B An enlarged perspective view showing Vb portion in FIG. 3.
Figure 6:
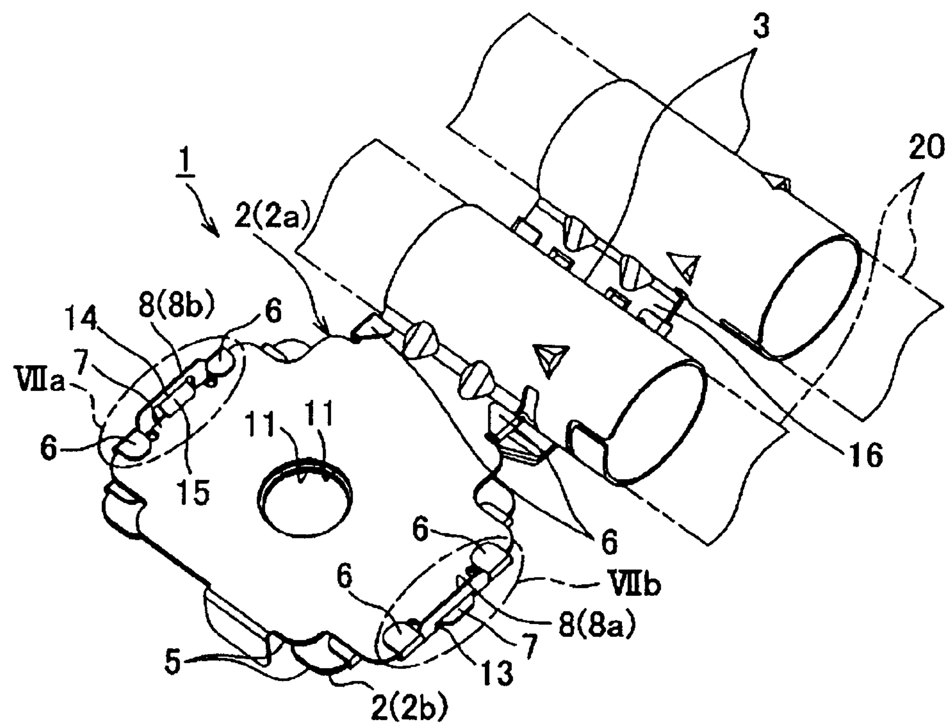
FIG. 6A perspective view showing a condition terminals shown in FIG. 3 are fixed to each other.

Two lock-receiving portions 8 are provided on the other terminal 2*b* disposed on a lower side of FIG. 3 of the two terminals 2*a*, 2*b*. As shown in FIGS. 5A and 5B, the lock-receiving portion 8 is interposed between the crimping piece 6 disposed on an end of the terminal 2*b* away from the shield fixing portion 3 and the crimping piece 6 disposed at the center of the terminal 2*b*. The two lock-receiving portions 8 are arranged with a gap in the longitudinal direction of the shielded wire 20 attached to the shield fixing portion 3. Therefore, these two lock-receiving portions 8 are arranged with a gap in a circumferential direction around the through hole 11.

One lock-receiving portion 8*a* disposed at a front side of FIG. 3 of the two lock-receiving portions 8 is, as shown in FIG. 5B, extended vertically from an outer edge of the metal plate 10*b* composing the attaching portion 5 toward the one terminal 2*a*. A hole 13 for inserting the locking portion 7 is provided in the center of the one lock-receiving portion 8*a*.

As shown in FIG. 5, the other lock-receiving portion 8*b* disposed at a back side of FIG. 3 of the two lock-receiving portions 8 includes: a flake-shaped main body 14 extended vertically from an outer edge of the metal plate 10*b* composing the attaching portion 5 toward the one terminal 2*a*; and a flake-shaped clamping piece 15 continued to the main body 14 and extended toward the attaching portion 5 and the one lock-receiving portion 8*a*.

Figure 7A:
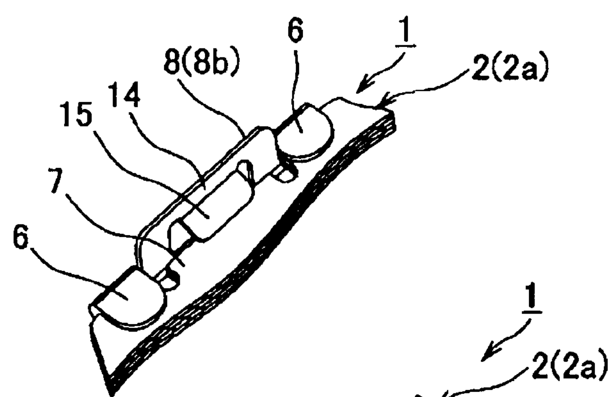
FIG. 7A An enlarged perspective view showing VIIa portion in FIG. 6.
Figure 7B:
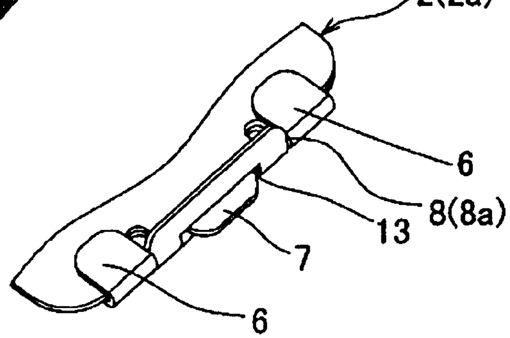
FIG. 7B An enlarged perspective view showing VIIb portion in FIG. 6.

As shown in FIG. 7B, one locking portion 7 is inserted into the hole 13 of the one lock-receiving portion 8*a*, and as shown in FIG. 7A, the other locking portion 7 is clamped between the clamping piece 15 of the other lock-receiving portion 8*b* and the attaching portion 5, thereby the locking portions 7 are locked in the lock-receiving portions 8*a*, 8*b*. Thus, the two terminals 2*a*, 2*b* are fixed to each other in a manner that the attaching portions 5 are overlapped with each other.

Further, the other terminal 2*b* includes a joint plate portion 16 jointing the shield fixing portion 3 and the attaching portion 5. The joint plate portion 16 is made by overlapping two metal plates similar to the attaching portion 5. The crimping pieces 6 are also provided on the joint plate portion 16.

In the terminal pair 1, the terminals 2*a*, 2*b* are fixed to each other when the attaching portions 5 are overlapped with each other, and the locking portions 7 are locked in the lock-receiving portions 8*a*, 8*b*. Further, the terminal pair 1 is attached to the vehicle body panel 4, namely, the vehicle body when the attaching portion 5 is overlapped with the vehicle body panel 4, the bolt 9 is inserted into the through hole 11, and the bolt 9 is screwed into the weld nut 12. Thus, the terminal pair 1 electrically connects the braid of the shielded wire 20 to the vehicle body panel 4.

According to this embodiment, because the locking portions 7 are provided on the one terminal 2*a*, and the lock-receiving portions 8*a*, 8*b* are provided on the other terminal 2*b*, the locking portions 7 are locked in the lock-receiving portions 8*a*, 8*b* to fix the terminals 2*a*, 2*b* to each other before the terminal pair is attached to the vehicle body panel 4. Therefore, when the bolt 9 is attached to, namely, fastened to the vehicle body panel 4, a relative position relationship between the attaching portions 5 of the terminals 2*a*, 2*b* is prevented from changing. Even when the attaching portion 5 of the upper terminal 2*a* is tried to be rotated, because the upper terminal 2*a* is fixed to the lower terminal 2*b*, the terminals 2*a*, 2*b* are hard to be rotated about the bolt 9. Therefore, the terminal pair 1 can be easily attached to the vehicle body panel 4, and the relative position relationship between the terminals 2*a*, 2*b* can be maintained in the regular position relationship.

Further, because the locking portions 7 and the lock-receiving portions 8*a*, 8*b* are arranged with a gap in the circumferential direction around the through hole 11, the terminals 2*a*, 2*b* are more surely fixed to each other. Therefore, the terminal pair 1 can be more easily attached to the vehicle body panel 4, and the relative position relationship between the terminals 2*a*, 2*b* can be surely maintained in the regular position relationship.

Further, because the locking portion 7 is formed in a claw shape, and the one lock-receiving portion 8*a* is formed in a flake shape and provided with the hole 13 for inserting the locking portion 7, the locking portion 7 can be locked in the lock-receiving portion 8*a* by inserting the claw-shaped locking portion 7 into the hole 13 of the flake-shaped lock-receiving portion 8*a*. Therefore, before attaching the terminals 2*a*, 2*b* to the vehicle body panel 4, the terminals 2*a*, 2*b* can be more surely fixed to each other.

Because the other lock-receiving portion 8*b* includes: a flake-shaped main body 14; and a clamping piece 15 continued to the main body 14 for clamping the locking portion 7 with the attaching portion 5, the locking portion 7 is locked in the lock-receiving portion 8*b* by clamping the claw-shaped locking portion 7 with the attaching portion 5 and the clamping piece 15. Further, because the one lock-receiving portion 8*a* is formed in a flake shape having the hole 13, and the other lock-receiving portion 8*b* includes a clamping piece 15, even when a dimension error is generated in the terminals 2*a*, 2*b*, the attaching portions 5, namely, terminals 2*a*, 2*b* are surely fixed to each other by a plurality of lock-receiving portions 8*a*, 8*b*.

Because the crimping piece 6 is provided at a position where the locking portion 7 or the lock-receiving portion 8*a*, 8*b* is positioned between the attaching portions 5, two metal plates 10*a*, 10*b* composing the attaching portions 5 are surely fixed to each other, further, when the crimping pieces 6 for positioning the locking portions 7 therebetween abut on sides of the lock-receiving portions 8*a*, 8*b*, the terminals 2*a*, 2*b* are prevented from rotating relative to each other.

Because the crimping pieces 6 are also provided on an end of the attaching portion 5 near the shield fixing portion 3, and an end of the attaching portion 5 away from the shield fixing portion 3, the two metal plates 10*a*, 10*b* composing the attaching portions 5 are further surely fixed to each other.

According to the above-described embodiment, two locking portions 7 and two lock-receiving portions 8*a*, 8*b* are provided. However, according to the present invention, more than two locking portions and more than two lock-receiving portions may be provided.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST

1 terminal pair
2*a* terminal (one terminal)
2*b* terminal (the other terminal)
3 shield fixing portion
4 vehicle body panel (attached member)
5 attaching portion
6 crimping piece
7 locking portion
8 lock-receiving portion
8*a* one of the lock-receiving portions
8*b* the other lock-receiving portions
9 bolt (fastening member)
10, 10*a*, 10*b* metal plate
11 through hole
13 hole
14 main body portion
15 clamping piece
20 shielded electric wire

The invention claimed is:

1. A terminal pair comprising: a pair of terminals each having a shield fixing portion to which a shield electric wire is attached, and an attaching portion continued to the shield fixing portion and attached to an attached member by overlapping with the attached member and by fastening a fastening member, said pair of terminals being configured to be attached to the attached member when the attaching portions of the pair of terminals are overlapped with each other, and the fastening member is fastened, wherein one of the pair of terminals has a locking portion mounted on the attaching portion, and the other one of the pair of terminals has a lock-receiving portion mounted on the attaching portion to be locked by the locking portion wherein the locking portion is formed in a claw shape projected outward from an edge of the attaching portion of the one terminal, wherein one of the lock-receiving portions is formed in a flake shape extended vertically from an end of the attaching portion of the other terminal toward the one terminal and provided with a hole for inserting the locking portion, and wherein the other lock-receiving portion includes: a flake shaped main body extended vertically from an edge of the other terminal toward the one terminal, and a clamping piece continued from the main body and extended from the main body toward the attaching portion and configured to clamp the locking portion with the attaching portion.

2. The terminal pair as claimed in claim 1, wherein a plurality of the locking portions and a plurality of the lock-receiving portions are respectively provided separately from each other in a circumferential direction around a through hole for inserting the fastening member of the attached member.

3. The terminal pair as claimed in claim 1, wherein the attaching portion of each terminal is made by overlapping two metal plates, and includes a crimping piece continued from an edge of the one metal plate for fixing the two metal plates to each other by being folded in a manner to overlap with the other metal plate, and wherein the crimping piece is provided at a position where the locking portion or the lock-receiving portion is positioned between attaching portions.

4. The terminal pair as claimed in claim 2, wherein the attaching portion of each terminal is made by overlapping two metal plates, and includes a crimping piece continued from an edge of the one metal plate for fixing the two metal plates to each other by being folded in a manner to overlap with the other metal plate, and wherein the crimping piece is provided at a position where the locking portion or the lock-receiving portion is positioned between attaching portions.

* * * * *